United States Patent
Tomita (10) Patent No.: US 7,426,593 B2
(45) Date of Patent: Sep. 16, 2008

(54) INFORMATION PROCESSING SYSTEM, REPRODUCING TERMINAL DEVICE AND REPRODUCING METHOD, INFORMATION PROCESSING DEVICE AND METHOD, AND PROGRAM FOR SYNCHRONOUS DISPLAY OF CONTENT

(75) Inventor: Nobuyoshi Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 11/349,265

(22) Filed: Feb. 8, 2006

(65) Prior Publication Data

US 2006/0190618 A1   Aug. 24, 2006

(30) Foreign Application Priority Data

Feb. 24, 2005   (JP) .................... P2005-048249

(51) Int. Cl.
G06F 15/16   (2006.01)
G06F 9/46   (2006.01)

(52) U.S. Cl. .................. 710/106; 709/231; 719/313; 345/520

(58) Field of Classification Search ......... 710/106, 710/61, 200; 709/231–232; 719/313; 345/204, 345/156, 520, 2.2, 213; 715/530, 733, 751, 715/400
See application file for complete search history.

(56) References Cited

U.S. PATENT DOCUMENTS

| | | | | |
|---|---|---|---|---|
| 3,500,336 A * | 3/1970 | Cuccio | .................. | 358/1.1 |
| 3,500,338 A * | 3/1970 | Bowman et al. | .............. | 358/1.1 |
| 3,501,749 A * | 3/1970 | Cuccio | .................. | 345/168 |
| 3,516,068 A * | 6/1970 | Howard et al. | .............. | 345/168 |
| 3,525,079 A * | 8/1970 | Cuccio | .................. | 358/1.1 |
| 3,543,244 A * | 11/1970 | Cuccio | .................. | 358/1.1 |
| 4,589,754 A * | 5/1986 | Maitani et al. | .............. | 396/290 |
| 5,606,348 A * | 2/1997 | Chiu | .................. | 345/213 |
| 7,024,508 B2 * | 4/2006 | Gros et al. | .............. | 710/305 |
| 7,130,616 B2 * | 10/2006 | Janik | .................. | 455/412.1 |
| 7,188,353 B1 * | 3/2007 | Crinon | .................. | 725/32 |
| 2004/0027252 A1 * | 2/2004 | Hudson | .................. | 340/855.1 |
| 2004/0039934 A1 * | 2/2004 | Land et al. | .................. | 713/200 |
| 2004/0146285 A1 * | 7/2004 | Matsui et al. | .................. | 386/98 |
| 2005/0108754 A1 * | 5/2005 | Carhart et al. | .................. | 725/47 |
| 2005/0283209 A1 * | 12/2005 | Katoozi et al. | .................. | 607/60 |

(Continued)

FOREIGN PATENT DOCUMENTS

JP   2004-220357   8/2004

OTHER PUBLICATIONS

"Single-chip video processing system" by H.J.Desor (abstract only) Publication Date: Aug. 1991.*

Primary Examiner—Gopal C. Ray
(74) Attorney, Agent, or Firm—Finnegan, Henderson, Farabow, Garrett & Dunner, L.L.P.

(57) ABSTRACT

In a transmitting terminal, a first displaying section displays, synchronously with a receiving terminal, a portion of content that has been transmitted to the receiving terminal. A second displaying section displays a portion of the content that has yet to be transmitted to the receiving terminal. A saving flag setting section sets a saving flag, the saving flag specifying whether to permit or prohibit the receiving terminal to save the content after the receiving terminal receives and displays the content. An adder adds the saving flag to the content; and a transmitter transmits the content to the receiving terminal with the saving flag.

14 Claims, 9 Drawing Sheets

U.S. PATENT DOCUMENTS

2006/0129933 A1* 6/2006 Land et al. .................. 715/723
2006/0149813 A1* 7/2006 Janik .......................... 709/203
2006/0170666 A1* 8/2006 Guillemot ................... 345/204
2006/0190618 A1* 8/2006 Tomita ....................... 709/231

* cited by examiner

INFORMATION PROCESSING SYSTEM, REPRODUCING TERMINAL DEVICE AND REPRODUCING METHOD, INFORMATION PROCESSING DEVICE AND METHOD, AND PROGRAM FOR SYNCHRONOUS DISPLAY OF CONTENT

CROSS REFERENCES TO RELATED APPLICATIONS

The present invention contains subject matter related to Japanese Patent Application JP 2005-048249 filed with the Japanese Patent Office on Feb. 24, 2005, the entire contents of which being incorporated herein by reference.

BACKGROUND OF THE INVENTION

The present invention relates to an information processing system, a transmitting terminal and a method of operation, a receiving terminal and a method of operation, and a program, and particularly to an information processing system, a transmitting terminal and a method of operation, a receiving terminal and a method of operation, and a program that make it possible to make a setting for permitting or prohibiting saving of a content after synchronous reproduction thereof and transmit the content when the transmitting terminal transmits the content to a plurality of receiving terminals and performs the synchronous reproduction.

Recently, along with wide networks such as the Internet and the like, a so-called ad hoc network is spreading in which devices at a same place form a network and communicate with each other in only that place.

A file sharing tool or a tool for chatting or the like may be used between a group formed by an ad hoc network. When forms of communication are developed further in the future, there is expected to be for example an increasing demand to transfer a still image, a moving image, sound or the like recorded by a given person to a plurality of devices such as portable telephones, digital still cameras, mobile viewers and the like possessed by friends of the given person to view the still image, the moving image, the sound or the like simultaneously, or to save the viewed data.

In this case, however, it is expected that a transmitter will desire to impose a "saving limitation" such that the transmitter allows a predetermined content to be viewed by a receiver but does not want the content to be saved, depending on the receiver viewing the content or the content. That is, conventionally, when a content is transferred to a plurality of devices, the devices receiving the content have no choice but to copy the data to a flash memory or the like. Consequently, not only is it impossible to perform synchronous reproduction, but also all the data is surely saved in the devices to which the data is transferred.

Techniques related to the saving limitation include for example a method that allows saving of all contents but does not allow viewing unless other information is obtained, and a method that does not allow saving of any contents as in copyguard for digital broadcasting. For example, see Patent Document 1 (Japanese Patent Laid-open No. 2004-220357).

SUMMARY OF THE INVENTION

However, these techniques do not provide a mechanism or a device that enables a transmitter to set a saving limitation to each content flexibly when synchronous reproduction is performed between devices as mentioned above.

Thus, in a situation where contents such as still images, moving images, sound or the like recorded in a predetermined device are transferred to one or a plurality of devices connected to a network to be reproduced synchronously, there is no method that allows a user of the device on a transmitting side to limit saving of each content by the device on a receiving side according to the receiver or the content.

The present invention has been made in view of the above. In particular, in a situation where contents such as still images, moving images, sound or the like recorded in a predetermined device are transferred to one or a plurality of devices connected to a network to be reproduced synchronously, it is desirable to allow a user of the device on a transmitting side to limit saving of each content by the device on a receiving side according to the receiver or the content.

According to an embodiment of the present invention, there is provided an information processing system wherein a transmitting terminal includes first displaying means for displaying an already transmitted content in synchronism with a receiving terminal after transmission of the content to the receiving terminal, second displaying means for displaying a content yet to be transmitted to the receiving terminal, saving flag setting means for setting a saving flag for specifying whether to permit or prohibit saving of the content yet to be transmitted to the receiving terminal after the content is once displayed on the receiving terminal when transmitted to the receiving terminal, in a state in which the first displaying means is displaying the content already transmitted to the receiving terminal in synchronism with the receiving terminal and the second displaying means is simultaneously displaying the content yet to be transmitted to the receiving terminal, adding means for adding the saving flag to the content yet to be transmitted to the receiving terminal, and transmitting means for transmitting the content yet to be transmitted to the receiving terminal with the saving flag added to the content to at least one receiving terminal, and a receiving terminal includes receiving means for receiving the content transmitted from the transmitting terminal to which content the saving flag is added, third displaying means for displaying the content received by the receiving means in synchronism with the transmitting terminal, saving setting means for making a setting to save the content displayed by the third displaying means in a state in which the third displaying means is displaying the content, determining means for determining whether the saving flag added to the content received by the receiving means permits or prohibits the saving of the content, and saving means for saving the content when the saving setting means makes the setting to save the content and when the determining means determines that the saving of the content is permitted.

According to an embodiment of the present invention, there is provided a transmitting terminal including: first displaying means for displaying an already transmitted content in synchronism with a receiving terminal after transmission of the content to the receiving terminal; second displaying means for displaying a content yet to be transmitted to the receiving terminal; saving flag setting means for setting a saving flag for specifying whether to permit or prohibit saving of the content yet to be transmitted to the receiving terminal after the content is once displayed on the receiving terminal when transmitted to the receiving terminal, in a state in which the first displaying means is displaying the content already transmitted to the receiving terminal in synchronism with the receiving terminal and the second displaying means is simultaneously displaying the content yet to be transmitted to the receiving terminal; adding means for adding the saving flag to the content yet to be transmitted to the receiving terminal; and transmitting means for transmitting the content yet to be transmitted to the receiving terminal with the saving flag added to the content to at least one receiving terminal.

The content can include sound data and image data.

The transmitting terminal can further include: time information obtaining means for obtaining time information; and reproduction time information setting means for setting a reproduction time of the content; wherein the adding means can add information of the reproduction time to the content in addition to the saving flag, and the first displaying means can display the content already transmitted to the receiving terminal at the reproduction time in synchronism with the receiving terminal.

According to an embodiment of the present invention, there is provided a method of operation of a transmitting terminal, the method including: a first displaying step of displaying an already transmitted content in synchronism with a receiving terminal after transmission of the content to the receiving terminal; a second displaying step of displaying a content yet to be transmitted to the receiving terminal; a saving flag setting step of setting a saving flag for specifying whether to permit or prohibit saving of the content yet to be transmitted to the receiving terminal after the content is once displayed on the receiving terminal when transmitted to the receiving terminal, in a state in which a process of the first displaying step is displaying the content already transmitted to the receiving terminal in synchronism with the receiving terminal and a process of the second displaying step is simultaneously displaying the content yet to be transmitted to the receiving terminal; an adding step of adding the saving flag to the content yet to be transmitted to the receiving terminal; and a transmitting step of transmitting the content yet to be transmitted to the receiving terminal with the saving flag added to the content to at least one receiving terminal.

According to an embodiment of the present invention, there is provided a first program for making a computer perform a process including: a first displaying step of displaying an already transmitted content in synchronism with a receiving terminal after transmission of the content to the receiving terminal; a second displaying step of displaying a content yet to be transmitted to the receiving terminal; a saving flag setting step of setting a saving flag for specifying whether to permit or prohibit saving of the content yet to be transmitted to the receiving terminal after the content is once displayed on the receiving terminal when transmitted to the receiving terminal, in a state in which a process of the first displaying step is displaying the content already transmitted to the receiving terminal in synchronism with the receiving terminal and a process of the second displaying step is simultaneously displaying the content yet to be transmitted to the receiving terminal; an adding step of adding the saving flag to the content yet to be transmitted to the receiving terminal; and a transmitting step of transmitting the content yet to be transmitted to the receiving terminal with the saving flag added to the content to at least one receiving terminal.

According to an embodiment of the present invention, there is provided a receiving terminal including: receiving means for receiving a content transmitted from a transmitting terminal to which content a saving flag specifying whether to permit or prohibit saving of the content after the content is once displayed is added; displaying means for displaying the content received by the receiving means in synchronism with the transmitting terminal; saving setting means for making a setting to save the content displayed by the displaying means in a state in which the displaying means is displaying the content; determining means for determining whether the saving flag added to the content received by the receiving means permits or prohibits the saving of the content; and saving means for saving the content when the saving setting means makes the setting to save the content and when the determining means determines that the saving of the content is permitted.

The content can include sound data and image data.

The receiving terminal can further include time information obtaining means for obtaining time information, in addition to the saving flag, information of a reproduction time is added to the content, and the displaying means can display the content received by the receiving means at the reproduction time in synchronism with the transmitting terminal.

The saving means can erase the content when the setting to save the content is not made by the saving setting means or when the determining means determines that the saving of the content is prohibited.

According to an embodiment of the present invention, there is provided a method of operation of a receiving terminal, the method including: a receiving step of receiving a content transmitted from a transmitting terminal to which content a saving flag specifying whether to permit or prohibit saving of the content after the content is once displayed is added; a displaying step of displaying the content received by a process of the receiving step in synchronism with the transmitting terminal; a saving setting step of making a setting to save the content displayed by a process of the displaying step in a state in which the content is being displayed by the process of the displaying step; a determining step of determining whether the saving flag added to the content received by the process of the receiving step permits or prohibits the saving of the content; and a saving step of saving the content when a process of the saving setting step makes the setting to save the content and when the determining step determines that the saving of the content is permitted.

According to an embodiment of the present invention, there is provided a second program for making a computer perform a process including: a receiving step of receiving a content transmitted from a transmitting terminal to which content a saving flag specifying whether to permit or prohibit saving of the content after the content is once displayed is added; a displaying step of displaying the content received by a process of the receiving step in synchronism with the transmitting terminal; a saving setting step of making a setting to save the content displayed by a process of the displaying step in a state in which the content is being displayed by the process of the displaying step; a determining step of determining whether the saving flag added to the content received by the process of the receiving step permits or prohibits the saving of the content; and a saving step of saving the content when a process of the saving setting step makes the setting to save the content and when the determining step determines that the saving of the content is permitted.

In the information processing system according to the embodiment of the present invention, the transmitting terminal displays an already transmitted content in synchronism with a receiving terminal after transmission of the content to the receiving terminal, displays a content yet to be transmitted to the receiving terminal, sets a saving flag for specifying whether to permit or prohibit saving of the content yet to be transmitted to the receiving terminal after the content is once displayed on the receiving terminal when transmitted to the receiving terminal, in a state in which the content already transmitted to the receiving terminal is being displayed in synchronism with the receiving terminal and the content yet to be transmitted to the receiving terminal is being displayed simultaneously, adds the saving flag to the content yet to be transmitted to the receiving terminal, and transmits the content yet to be transmitted to the receiving terminal with the saving flag added to the content to at least one receiving terminal, and the receiving terminal receives the content transmitted from the transmitting terminal to which content the saving flag is added, displays the received content in synchronism with the transmitting terminal, makes a setting to save the displayed content in a state in which the content is being displayed, determines whether the saving flag added to the received content permits or prohibits the saving of the content, and saves the content when the setting to save the content is made and when the saving of the content is permitted.

The transmitting terminal, the method of operation of the transmitting terminal, and the first program according to the embodiments of the present invention display an already transmitted content in synchronism with a receiving terminal after transmission of the content to the receiving terminal, display a content yet to be transmitted to the receiving terminal, set a saving flag for specifying whether to permit or prohibit saving of the content yet to be transmitted to the receiving terminal after the content is once displayed on the receiving terminal when transmitted to the receiving terminal, in a state in which the content already transmitted to the receiving terminal is being displayed in synchronism with the receiving terminal and the content yet to be transmitted to the receiving terminal is being displayed simultaneously, add the saving flag to the content yet to be transmitted to the receiving terminal, and transmit the content yet to be transmitted to the receiving terminal with the saving flag added to the content to at least one receiving terminal.

The receiving terminal, the method of operation of the receiving terminal, and the second program receive a content transmitted from a transmitting terminal to which content a saving flag specifying whether to permit or prohibit saving of the content after the content is once displayed is added, display the received content in synchronism with the transmitting terminal, make a setting to save the displayed content in a state in which the content is being displayed, determine whether the saving flag added to the received content permits or prohibits the saving of the content, and save the content when the setting to save the content is made and when the saving of the content is permitted.

The transmitting terminal and the receiving terminal according to the embodiments of the present invention may be an independent device, or may be a block performing a transmitting process or a receiving process.

According to the present invention, in a situation where contents such as still images, moving images, sound or the like recorded in a predetermined device are transferred to one or a plurality of devices connected to a network to be reproduced synchronously, it is possible to allow a user of the device on a transmitting side to limit saving of each content by the device on a receiving side according to the receiver or the content.

DETAILED DESCRIPTION OF THE PREFERRED EMBODIMENTS

Preferred embodiments of the present invention will hereinafter be described. Correspondences between inventions described in the present specification and embodiments of the inventions are illustrated as follows. This description is to confirm that embodiments supporting the inventions described in the present specification are described in the present specification. Therefore, even when there is an embodiment described in the embodiments of the inventions but not described here as corresponding to an invention, it does not mean that the embodiment does not correspond to the invention. Conversely, even when an embodiment is described here as corresponding to an invention, it does not mean that the embodiment does not correspond to inventions other than that invention.

Further, this description does not represent all the inventions described in the present specification. In other words, this description does not negate presence of inventions described in the present specification but not claimed in the present application, that is, presence of inventions to be presented or added by a divisional application or an amendment in the future.

A transmitting terminal according to an embodiment of the present invention includes: first displaying means (for example a content reproducing unit 19 in FIG. 2) for displaying an already transmitted content in synchronism with a receiving terminal after transmission of the content to the receiving terminal; second displaying means (for example a setting object content reproducing unit 18 in FIG. 2) for displaying a content yet to be transmitted to the receiving terminal; saving flag setting means (for example a user setting input unit 14 in FIG. 2) for setting a saving flag for specifying whether to permit or prohibit saving of the content yet to be transmitted to the receiving terminal after the content is once displayed on the receiving terminal when transmitted to the receiving terminal, in a state in which the first displaying means is displaying the content already transmitted to the receiving terminal in synchronism with the receiving terminal and the second displaying means is simultaneously displaying the content yet to be transmitted to the receiving terminal; adding means (for example a flag setting unit 15 in FIG. 2) for adding the saving flag to the content yet to be transmitted to the receiving terminal; and transmitting means (for example a data transmitting and receiving unit 13 in FIG. 2) for transmitting the content yet to be transmitted to the receiving terminal with the saving flag added to the content to at least one receiving terminal.

Figure 8:
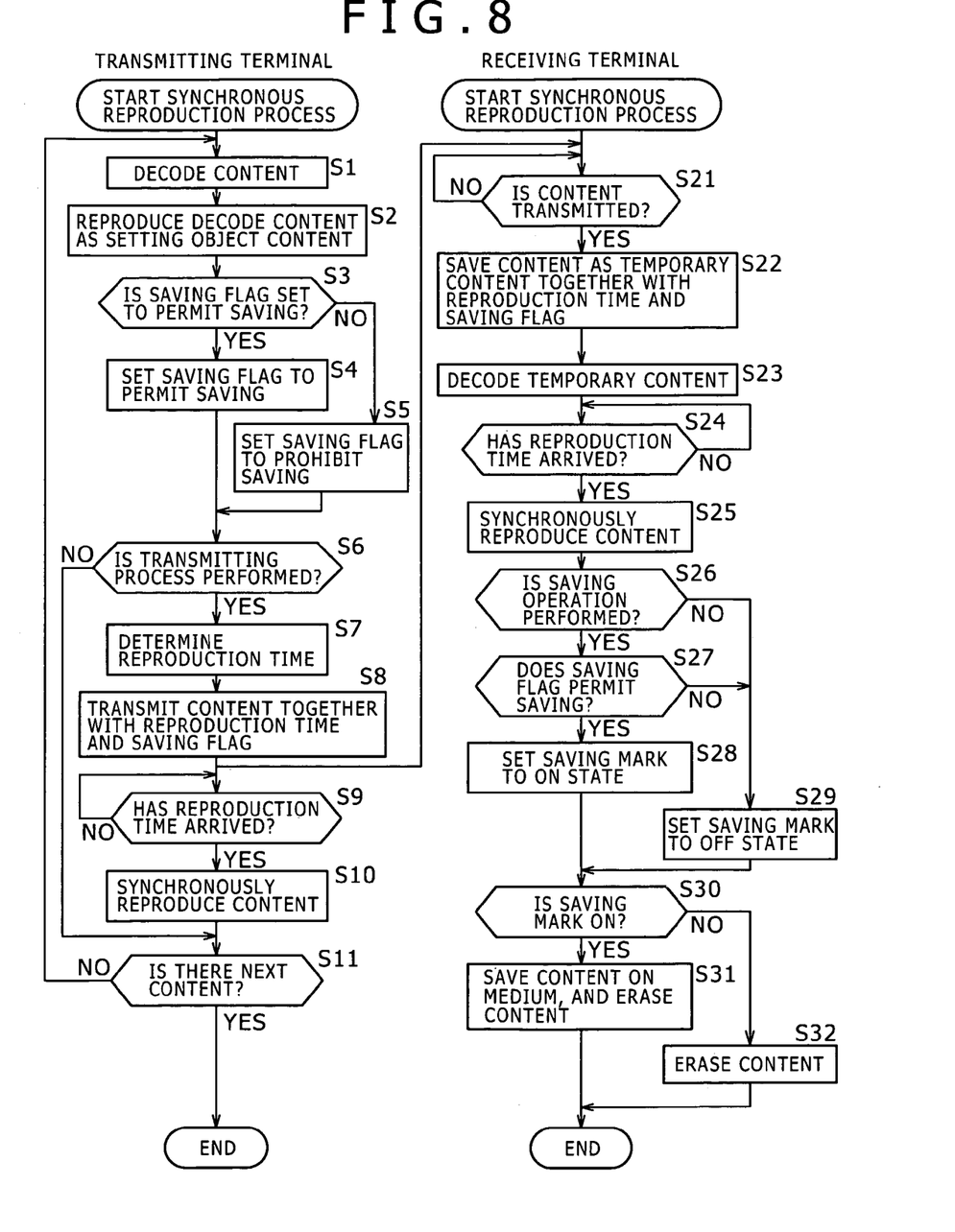
FIG. 8 is a flowchart of assistance in explaining a synchronous reproduction process in the synchronous reproduction system of FIG. 1.

A method of operation of a transmitting terminal according to an embodiment of the present invention includes: a first displaying step (for example a process of step S10 in a flowchart of FIG. 8) of displaying an already transmitted content in synchronism with a receiving terminal after transmission of the content to the receiving terminal; a second displaying step (for example a process of step S2 in the flowchart of FIG. 8) of displaying a content yet to be transmitted to the receiving terminal; a saving flag setting step (for example a process of step S3 in the flowchart of FIG. 8) of setting a saving flag for specifying whether to permit or prohibit saving of the content yet to be transmitted to the receiving terminal after the content is once displayed on the receiving terminal when transmitted to the receiving terminal, in a state in which a process of the first displaying step is displaying the content already transmitted to the receiving terminal in synchronism with the receiving terminal and a process of the second displaying step is simultaneously displaying the content yet to be transmitted to the receiving terminal; an adding step (for example a process of steps S4 and S5 in the flowchart of FIG. 8) of adding the saving flag to the content yet to be transmitted to the receiving terminal; and a transmitting step (for example a process of step S8 in the flowchart of FIG. 8) of transmitting the content yet to be transmitted to the receiving terminal with the saving flag added to the content to at least one receiving terminal.

A receiving terminal according to an embodiment of the present invention includes: receiving means (for example data transmitting and receiving means 54 in FIG. 3) for receiving a content transmitted from a transmitting terminal to which content a saving flag specifying whether to permit or prohibit saving of the content after the content is once displayed is added; displaying means (for example a content reproducing unit 59 in FIG. 3) for displaying the content received by the receiving means in synchronism with the transmitting terminal; saving setting means (for example a user saving input unit 52 in FIG. 3) for making a setting to save the content displayed by the displaying means in a state in which the displaying means is displaying the content; determining means (for example a flag determining unit 55 in FIG. 3) for determining whether the saving flag added to the content received by the receiving means permits or prohibits the saving of the content; and saving means (for example a mark determining unit 56 in FIG. 3) for saving the content when the saving setting means makes the setting to save the content and when the determining means determines that the saving of the content is permitted.

A method of operation of a receiving terminal according to an embodiment of the present invention includes: a receiving step (for example a process of step S22 in a flowchart of FIG. 8) of receiving a content transmitted from a transmitting terminal to which content a saving flag specifying whether to permit or prohibit saving of the content after the content is once displayed is added; a displaying step (for example a process of step S25 in the flowchart of FIG. 8) of displaying the content received by a process of the receiving step in synchronism with the transmitting terminal; a saving setting step (for example a process of step S26 in the flowchart of FIG. 8) of making a setting to save the content displayed by a process of the displaying step in a state in which the content is being displayed by the process of the displaying step; a determining step (for example a process of step S27 in the flowchart of FIG. 8) of determining whether the saving flag added to the content received by the process of the receiving step permits or prohibits the saving of the content; and a saving step (for example a process of step S31 in the flowchart of FIG. 8) of saving the content when a process of the saving setting step makes the setting to save the content and when the determining step determines that the saving of the content is permitted.

Incidentally, an information processing system and a program are similar to the method of operation of the transmitting terminal and the method of operation of the receiving terminal, and thus description thereof will be omitted.

Figure 1:
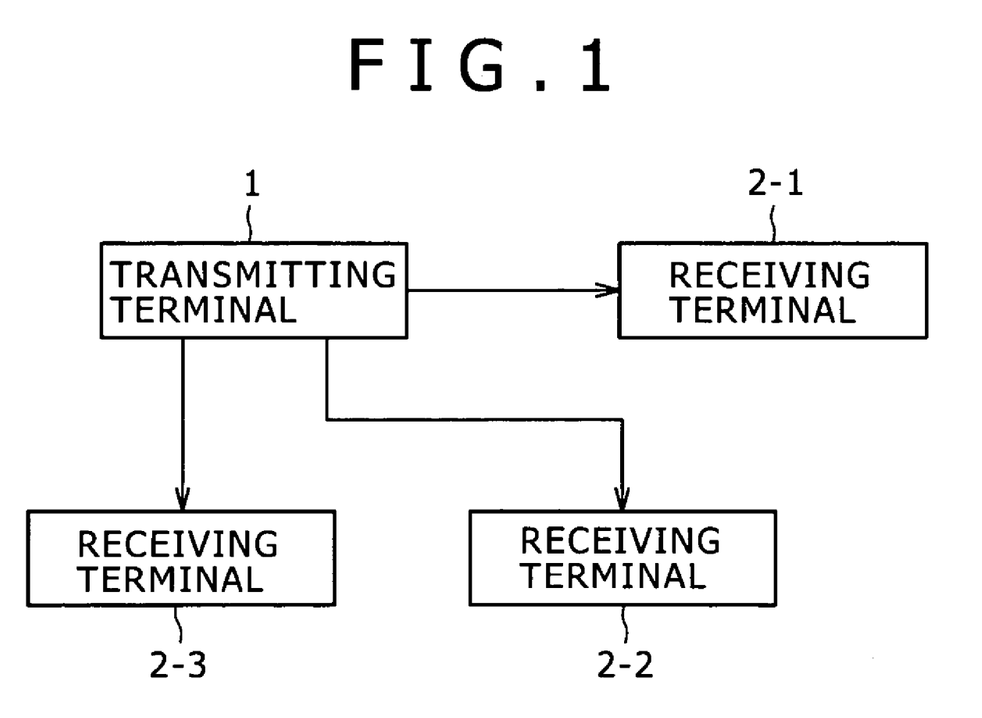
FIG. 1 is a diagram showing a configuration of an embodiment of a synchronous reproduction system.

FIG. 1 is a diagram showing a configuration of an embodiment of a synchronous reproduction system to which the present invention is applied.

A transmitting terminal 1 and receiving terminals 2-1 to 2-3 are for example formed by a portable type personal computer, a portable terminal, or the like. Each terminal has a function of reproducing contents composed of images (including still images and moving images) and sound, and a function of mutual communication. The transmitting terminal 1 and the receiving terminals 2-1 to 2-3 form for example an ad hoc network, in which the transmitting terminal 1 transmits a content to the receiving terminals 2-1 to 2-3 and the transmitting terminal 1 and the receiving terminals 2-1 to 2-3 can synchronously reproduce the content. Incidentally, when the receiving terminals 2-1 to 2-3 do not need to be specifically distinguished from each other, the receiving terminals 2-1 to 2-3 will be referred to simply as a receiving terminal 2. The same is true for other configurations.

The configuration of the transmitting terminal 1 will next be described with reference to FIG. 2.

A control unit 11 is a so-called microcomputer including a CPU (Central Processing Unit), a RAM (Random Access Memory), a ROM (Read Only Memory), and the like. The control unit 11 controls the operation of the whole of the transmitting terminal 1. In addition, the control unit 11 controls a drive 21 to read contents composed of for example sound and an image picked up by a digital camera, a video camera or the like and compressed in a compression format (for example MPEG (Moving Picture Experts Group) 2, JPEG (Joint Photographic Experts Group) 2000, or Motion JPEG or the like) from a medium (recording medium) 22 formed by a removable medium loaded into the drive 21. The control unit 11 saves (stores) the contents in a content and flag storing unit 16.

A content decompressing unit 17 reads the contents stored in the content and flag storing unit 16 in predetermined order, decompresses the contents in the predetermined format, and then supplies the decompressed contents to a setting object content reproducing unit 18. In addition, of contents stored in predetermined order in the content and flag storing unit 16, the content decompressing unit 17 decompresses the contents in the predetermined format which contents have been supplied to the setting object content reproducing unit 18 at an immediately preceding time and are specified to be transmitted to the receiving terminal 2. The content decompressing unit 17 supplies the decompressed contents to a content reproducing unit 19.

The setting object content reproducing unit 18 reproduces in order decompressed contents supplied from the content decompressing unit 17, the contents being stored in predetermined order in the content and flag storing unit 16. The setting object content reproducing unit 18 supplies the contents to a reproducing device 20 including for example an LCD (Liquid Crystal Display) for displaying an image and a speaker for outputting sound, so as to make the reproducing device 20 reproduce the contents.

Of the contents displayed by the setting object content reproducing unit 18, the content reproducing unit 19 supplies a content specified to be transmitted to the receiving terminal 2 to the reproducing device 20 including for example the LCD for displaying an image and the speaker for outputting sound, so as to make the reproducing device 20 reproduce the content.

Since a reproduction time is set to the content transmitted to the receiving terminal 2, the content reproducing unit 19 supplies the content to the reproducing device 20 in timing coinciding with the reproduction time on the basis of time information obtained by a time information obtaining unit 19a so as to make the content reproduced as an image or sound. A reproduction time is set to every content transmitted to the receiving terminal 2. As a result, the transmitting terminal 1 and the receiving terminal 2 receiving the transmitted content reproduce the content at the same time. Thus, so-called synchronous reproduction can be realized.

A user setting input unit 14 is operated by a user when setting a saving flag of a content reproduced by the setting object content reproducing unit 18 but not yet transmitted to the receiving terminal 2. The user setting input unit 14 supplies a description of the operation to a flag setting unit 15. The flag setting unit 15 sets the saving flag of the content that is now being reproduced by the setting object content reproducing unit 18 to permit or prohibit saving of the content according to the description of the operation. The flag setting unit 15 adds the saving flag to the content. The flag setting unit 15 then overwrites the content and flag storing unit 16 with the content.

The saving flag is set to indicate whether or not to permit the saving of the content after the content is once reproduced on the receiving terminal 2 when transmitted to the receiving terminal 2. Hence, when a user having a right of ownership to a given content allows the content to be shown on the receiving terminal 2-1 but does not desire the content to be saved by the receiving terminal 2-1, the saving flag can be set to prohibit the saving of the content. Conversely, when the user does not mind the content being viewed and saved, the user can operate the user setting input unit 14 to permit saving of the content.

A user transmission input unit 12 is operated by the user when the content reproduced by the setting object content reproducing unit 18 is desired to be transmitted to the receiving terminal 2. The user transmission input unit 12 supplies a signal corresponding to a description of the operation to a data transmitting and receiving unit 13.

When an instruction for transmission is given from the user transmission input unit 12, the data transmitting and receiving unit 13 reads the data of the content now being reproduced by the setting object content reproducing unit 18 from the content and flag storing unit 16, and controls a reproduction time setting unit 13a to add information on a reproduction time to the content. Thus, the content specified to be transmitted has the reproduction time added in addition to a saving flag. Further, the data transmitting and receiving unit 13 overwrites the content and flag storing unit 16 again with the content having the saving flag and the reproduction time added thereto, and transmits the content having the saving flag and the reproduction time added thereto to the receiving terminal 2. The reproduction time setting unit 13a sets, as the reproduction time, timing that allows the content to be reproduced promptly after being received, with a time for communication with the receiving terminal 2 taken into consideration.

Incidentally, though not shown in the figure, mutual authentication is performed between the data transmitting and receiving unit 13 and the receiving terminal 2, and then the data transmitting and receiving unit 13 performs communication with the authenticated receiving terminal 2. Thus, when the transmission of a content is requested, the transmission of the content is performed on a precondition that mutual authentication be performed between the data transmitting and receiving unit 13 and the receiving terminal 2 to which to transmit the content in any timing before the transmission of the content and that the data transmitting and receiving unit 13 and the receiving terminal 2 be in a state of being authenticated. Incidentally, in FIG. 2, a thick line represents a flow of contents, and a thin line represents a flow of an instruction signal. The same is true for subsequent drawings.

The configuration of the receiving terminal 2 will next be described with reference to FIG. 3.

A control unit 51 is a so-called microcomputer including a CPU, a RAM, and a ROM. The control unit 51 controls the operation of the whole of the receiving terminal 2.

A data transmitting and receiving unit 54 and the transmitting terminal 1 mutually authenticate each other in advance. When a content having a saving flag and a reproduction time added thereto is transmitted from the transmitting terminal 1 to the data transmitting and receiving unit 54 in an authenticated state, the data transmitting and receiving unit 54 receives the content, and saves (stores) the content in a content, flag, and mark storing unit 57.

A content decompressing unit 58 reads contents stored in the content, flag, and mark storing unit 57 in predetermined order, decompresses the contents in a predetermined format, and supplies the decompressed contents to a content reproducing unit 59.

The content reproducing unit 59 controls a time information obtaining unit 59a to reproduce the decompressed contents supplied to the content reproducing unit 59 at the reproduction time added to the contents, and supplies the contents to a reproducing device 60 including a display formed by an LCD or the like or a speaker, so that the contents are reproduced as an image or sound.

A user saving input unit 52 is operated by a user when a content being reproduced by the reproducing device 60 is to be saved. The user saving input unit 52 supplies a signal corresponding to a result of the operation to a mark setting unit 53.

When a saving instruction is given from the user saving input unit 52, the mark setting unit 53 controls a flag determining unit 55 to determine whether the saving flag of the content specified to be saved permits the saving of the content. When the saving of the content is permitted, the mark setting unit 53 sets a saving mark of the content specified to be saved to an on state. When the saving flag prohibits the saving of the content in the case where the saving instruction is given from the user saving input unit 52, or when no saving instruction is given from the saving input unit 52, the mark setting unit 53 sets the saving mark to an off state.

A mark determining unit 56 checks the saving mark of the content. When the saving mark is on, that is, when the content is permitted to be saved and specified to be saved, the mark determining unit 56 reads the data of the content stored in the content, flag, and mark storing unit 57 after the reproduction of the content is ended, and then supplies the data of the content to a drive 61 to save the data of the content to a medium 62. When the saving mark is off, that is, when a setting is made so as to prohibit the saving of the content or when the content is not specified to be saved, the mark determining unit 56 erases the data of the content stored in the content, flag, and mark storing unit 57 after the reproduction of the content is ended.

Figure 4:
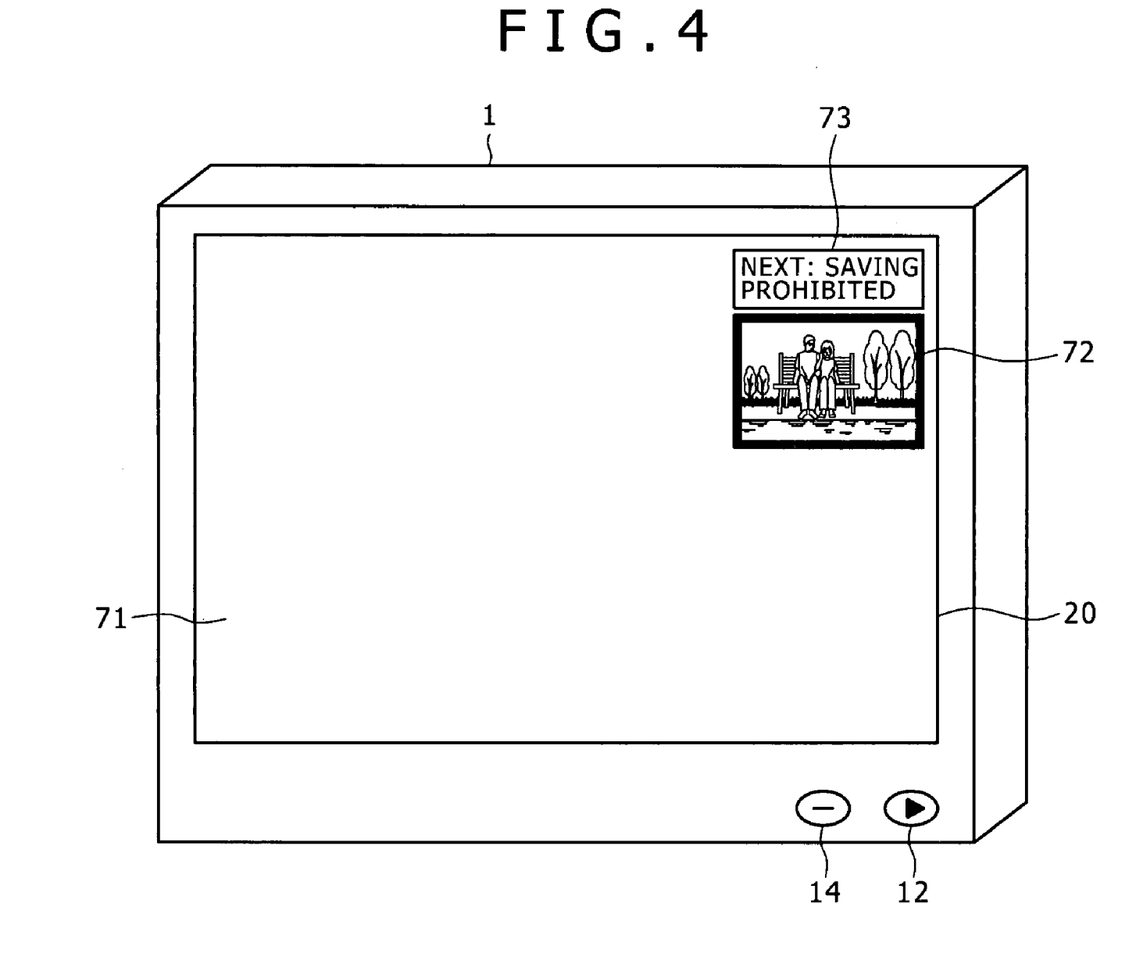
FIG. 4 is a perspective view of a configuration of the transmitting terminal in FIG. 1.
Figure 5:
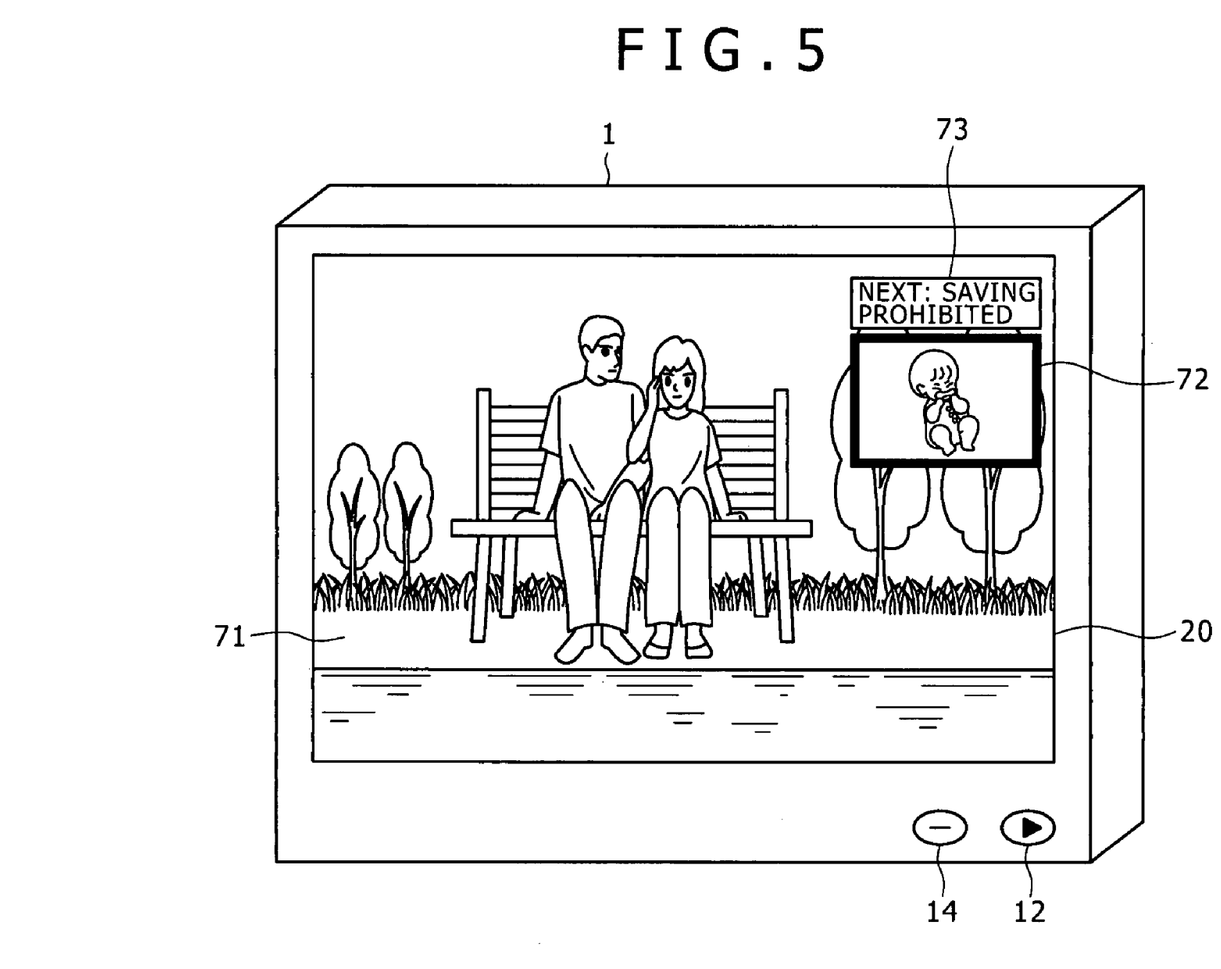
FIG. 5 is a perspective view of a configuration of the transmitting terminal in FIG. 1.
Figure 6:
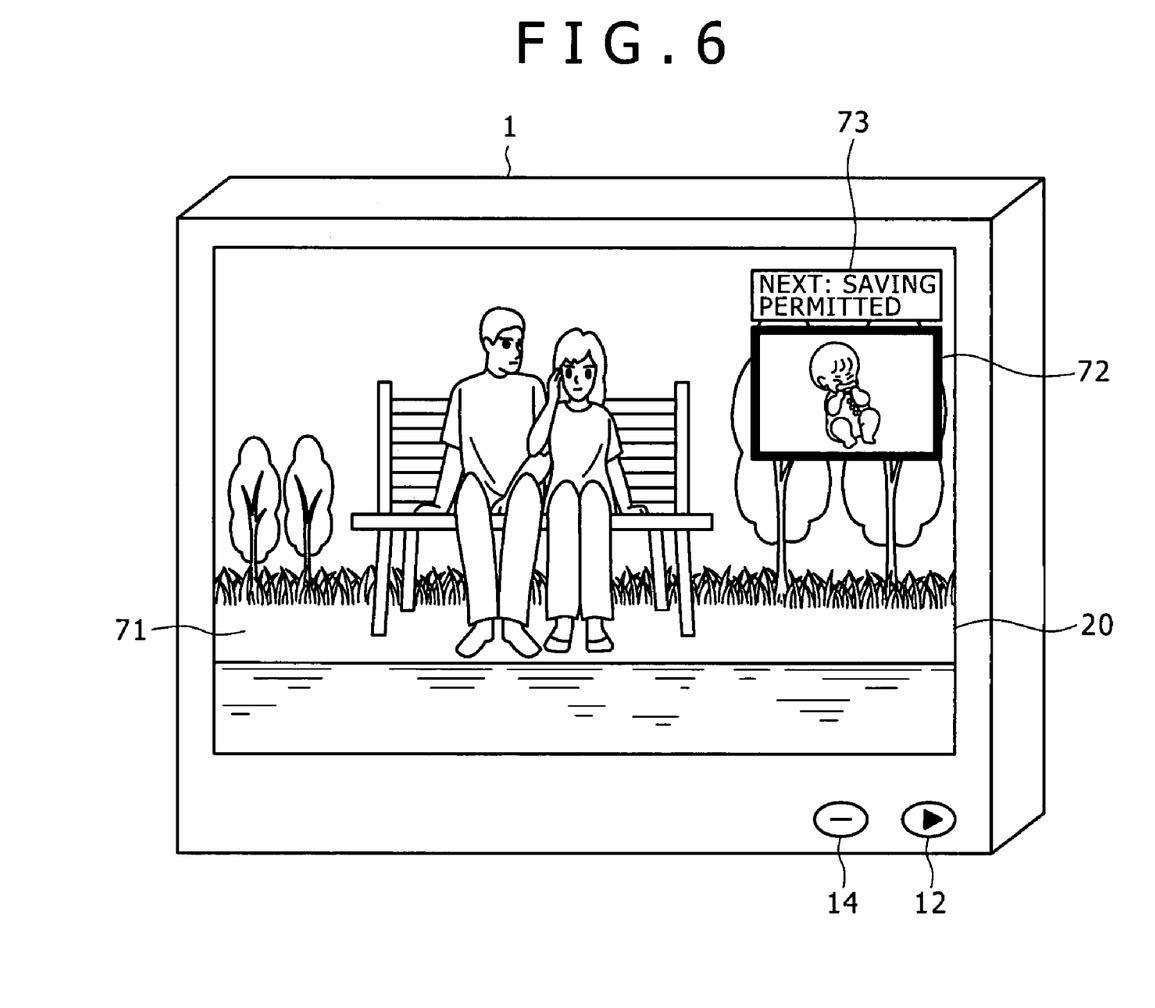
FIG. 6 is a perspective view of a configuration of the transmitting terminal in FIG. 1.

The operation of the transmitting terminal 1 will next be described with reference to FIGS. 4 to 6. FIGS. 4 to 6 are external perspective views of the transmitting terminal 1, showing different operating states. The reproducing device 20 of the portable terminal 1 has a setting object content displaying part 72 for displaying a content as an object for which to make a setting which content is supplied from the setting object content reproducing unit 18, and a content displaying part 71 for displaying a content transmitted to the receiving terminal 2 and supplied from the content reproducing unit 19. A saving flag displaying part 73 for the setting object content is provided above the setting object content displaying part 72. In the example of FIG. 4, "Next: saving prohibited" is displayed in the saving flag displaying part 73. This indicates that for the content as an object for which to set a saving flag which content is stored in the content, flag, and mark storing unit 57 next to the content displayed in the content displaying part 71 and is displayed in the setting object content displaying part 72, the saving flag is set to prohibit saving of the content. A button of the user transmission input unit 12 is provided on a right side below the reproducing device 20, and a button of the user setting input unit 14 is provided on the left side of the button of the user transmission input unit 12.

When the user transmission input unit 12 is pressed in a state of FIG. 4 by a user to transmit the setting object content displayed in the setting object content displaying part 72, for example, the content displayed in the setting object content displaying part 72 in FIG. 4 is transmitted to the receiving terminal 2, and the content reproducing unit 19 makes the transmitted content displayed in the content displaying part 71 at a set reproduction time, as shown in FIG. 5. At this time, the setting object content reproducing unit 18 receives a content stored in the content and flag storing unit 16 next to the content now being reproduced by the content reproducing unit 19 from the content decompressing unit 17, and displays the content in the setting object content displaying part 72 in the form of a child screen within the content displaying part 71.

When the user setting input unit 14 is pressed in a state of the content being displayed in the setting object content displaying part 72 in FIG. 5, "Next: saving permitted" is displayed in the saving flag displaying part 73, as shown in FIG. 6. For the content as an object for which to set a saving flag which content is stored in the content, flag, and mark storing unit 57 next to the content displayed in the content displaying part 71 and is displayed in the setting object content displaying part 72, the saving flag is set to permit saving of the content. When the user setting input unit 14 is pressed again, the saving flag is set to prohibit the saving of the content. That is, the saving flag is set so as to be switched to saving permission or saving prohibition each time the user setting input unit 14 is pressed.

Figure 7:
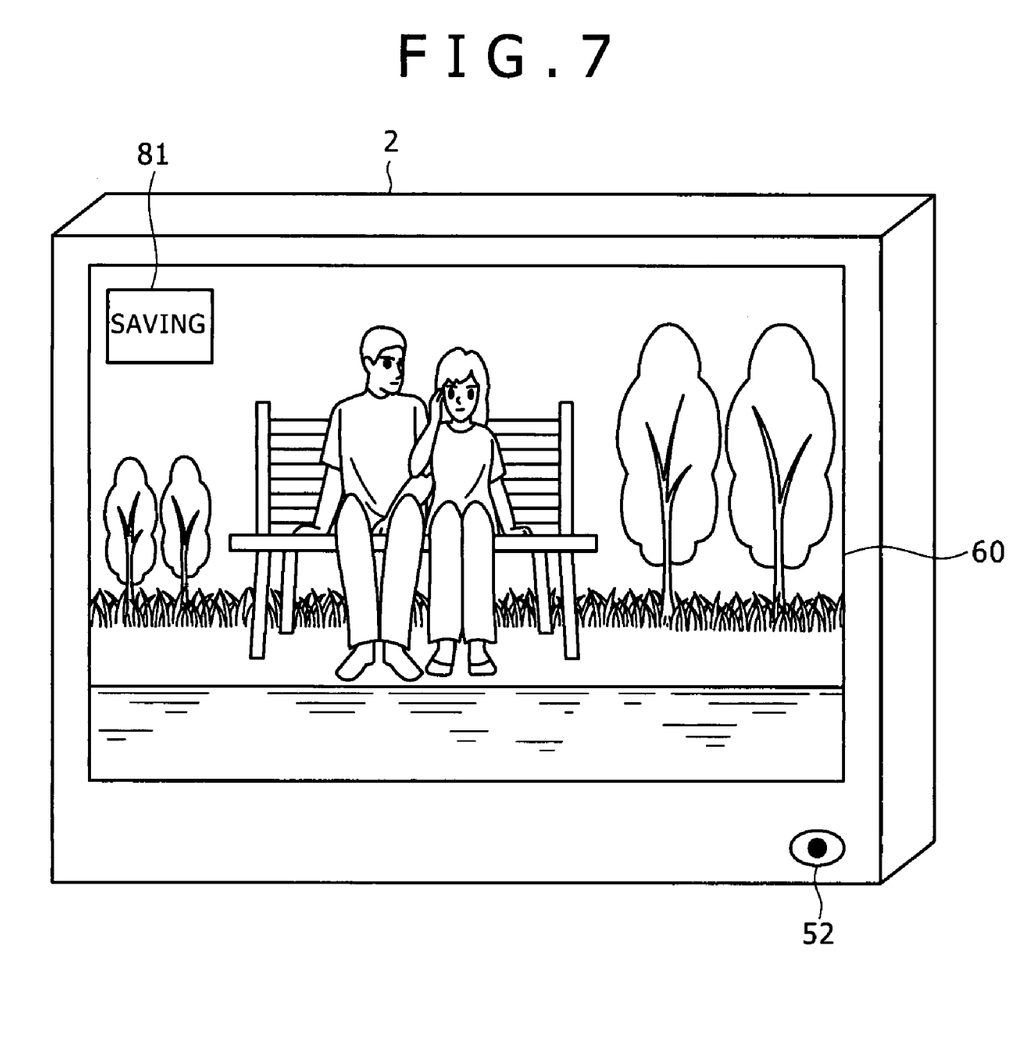
FIG. 7 is a perspective view of a configuration of the receiving terminal in FIG. 1.

The operation of the receiving terminal 2 will next be described with reference to FIG. 7. FIG. 7 is an external perspective view of the receiving terminal 2. In the receiving terminal 2, contents transmitted from the transmitting terminal 1 are displayed on the reproducing device 60. FIG. 7 shows a state in which the content transmitted when the user transmission input unit 12 is operated in the state of FIG. 4 is displayed on the reproducing device 60. In this state, when the user saving input unit 52 is operated and the saving flag permits saving, a saving display part 81 showing "Saving" is displayed at the upper left of the reproducing device 60, as shown in FIG. 7, and the data of the content specified to be saved is saved to the medium 62. When the user saving input unit 52 is operated once again, the display in the saving display part 81 disappears, and the saving of the content is cancelled. That is, each time the user saving input unit 52 is pressed, the saving display part 81 is switched to display or non-display, and a mark for saving the content is switched to an on state or an off state.

A synchronous reproduction process in the synchronous reproduction system of FIG. 1 will next be described with reference to a flowchart of FIG. 8. A process of the transmitting terminal 1 will first be described.

In step S1, the content decompressing unit 17 reads contents stored in the content and flag storing unit 16 in predetermined order, and decompresses (decodes) the contents. The content decompressing unit 17 then supplies the contents to the setting object content reproducing unit 18.

In step S2, the setting object content reproducing unit 18 converts the decompressed (decoded) content data supplied from the content decompressing unit 17 into data in a format reproducible by the reproducing device 20, and makes the reproducing device 20 display the data.

In step S3, the flag setting unit 15 determines whether a saving flag is set to permit saving. That is, as described with reference to FIGS. 4 to 6, the flag setting unit 15 is switched between the saving permitting state and the saving prohibiting state of the saving flag each time the user setting input unit 14 is pressed.

Accordingly, in step S3, as shown in FIG. 6, for example, when the user setting input unit 14 is operated in the case where the saving flag displaying part 73 for a content which part is displayed above the setting object content displaying part 72 displays "Next: saving permitted," the flag setting unit 15 determines that the saving flag is set to prohibit saving. In step S5, the flag setting unit 15 sets the saving flag indicating that "saving is prohibited" to the data of the content stored in the content and flag storing unit 16. In step S3, as shown in FIG. 5, for example, when the user setting input unit 14 is operated in the case where the saving flag displaying part 73 for a content which part is displayed above the setting object content displaying part 72 shows "Next: saving prohibited," the flag setting unit 15 determines that the saving flag is set to permit saving. In step S4, the flag setting unit 15 sets the saving flag indicating that "saving is permitted" to the data of the content stored in the content and flag storing unit 16.

In step S6, the data transmitting and receiving unit 13 determines whether the user transmission input unit 12 is operated to give an instruction to transmit the setting object content. When the data transmitting and receiving unit 13 determines that the user transmission input unit 12 is operated to give an instruction for the transmission process, for example, the process proceeds to step S7.

In step S7, the data transmitting and receiving unit 13 controls the reproduction time setting unit 13a to set the reproduction time of the content specified to be transmitted. The reproduction time setting unit 13a sets the reproduction time considering in advance a delay time (RTT: Round Trip Time) in one-way propagation to the receiving terminal 2 and a time required for a reproduction process of the reproducing device 2. Further, the data transmitting and receiving unit 13 adds the set reproduction time and the saving flag to the content, and overwrites the content and flag storing unit 16 with the content to thereby store the content in the content and flag storing unit 16.

In step S8, the data transmitting and receiving unit 13 transmits the content specified to be transmitted and the information of the saving flag and the reproduction time added to the content to the receiving terminal 2 via a communication path where an authentication process is performed in advance. At the same time, the content decompressing unit 17 reads the content overwritten with the reproduction time added thereto which content is reproduced by the setting object content reproducing unit 18 from the content and flag storing unit 16, decodes the content, and supplies the decoded content together with the information of the reproduction time to the content reproducing unit 19.

In step S9, the content reproducing unit 19 determines whether the reproduction time of the content has arrived on the basis of a time obtained by the time information obtaining unit 19a. This process is repeated until the reproduction time arrives. When the content reproducing unit 19 determines that the reproduction time has arrived, the content reproducing unit 19 in step S10 reproduces the decoded content, and supplies the reproduced content to the reproducing device 20 so that the content is output as an image and sound to the content displaying part 71.

In step S11, the content decompressing unit 17 determines whether there is a next content. When the content decompressing unit 17 determines that there is a next content, the process returns to step S1 to repeat the process from step S1 on down. On the other hand, the content decompressing unit 17 determines in step S11 that there is no next content, the process is ended.

Meanwhile, as for the receiving terminal 2, the data transmitting and receiving unit 54 determines in step S21 whether a content is transmitted. This process is repeated until a content is transmitted. When a content is transmitted from the transmitting terminal 1 as a result of the process of step S8, for example, the process proceeds to step S22.

In step S22, the data transmitting and receiving unit 54 saves (stores) the transmitted content having a reproduction time and a saving flag added thereto as a temporary content in the content, flag, and mark storing unit 57.

In step S23, the content decompressing unit 58 decodes (decompresses) the temporary content. The content decompressing unit 58 then supplies the decoded temporary content to the content reproducing unit 59 together with the information of the reproduction time.

In step S24, the content reproducing unit 59 determines whether the reproduction time has arrived on the basis of a present time obtained by controlling the time information obtaining unit 59a. This process is repeated until the reproduction time arrives. When the content reproducing unit 59 determines in step S24 that the reproduction time has arrived, the process proceeds to step S25.

In step S25, the content reproducing unit 59 supplies the decoded content to the reproducing device 60, and thus reproduces the content composed of an image and sound. At this time, the content reproducing unit 59 starts reproducing the content at the same reproduction time as the content reproducing unit 19 in the transmitting terminal 1. Therefore, the reproducing devices 20 and 60 reproduce the same content synchronously.

In step S26, the mark setting unit 53 determines whether the user saving input unit 52 is operated to save the content now being reproduced. When the mark setting unit 53 determines in step S26 that the user saving input unit 52 is operated to save the content now being reproduced, the process proceeds to step S27, where the mark setting unit 53 controls the flag determining unit 55 to determine whether the saving flag of the content permits the saving of the content. For example, when the flag determining unit 55 determines that the saving flag of the content permits the saving of the content, the process proceeds to step S28, where the mark setting unit 53 sets a saving mark of the content now being reproduced which content is stored in the content, flag, and mark storing unit 57 to an on state.

On the other hand, when the mark setting unit 53 determines in step S26 that the saving operation is not performed, or when the flag determining unit 55 determines that the saving flag does not permit the saving of the content, the mark setting unit 53 in step S29 sets the saving mark of the content now being reproduced which content is stored in the content, flag, and mark storing unit 57 to an off state.

In step S30, the mark determining unit 56 determines whether the saving mark of the content now being reproduced which content is stored in the content, flag, and mark storing unit 57 is on. For example, when the mark determining unit 56 determines that the saving mark is on, the mark determining unit 56 in step S31 reads the data of the content, and supplies the data of the content to the drive 61 to save (store) the data of the content on the medium 62 loaded in the drive 61, and erases the data of the content stored in the content, flag, and mark storing unit 57.

When the mark determining unit 56 determines in step S30 that the saving mark is off, the mark determining unit 56 in step S32 erases the data of the content stored in the content, flag, and mark storing unit 57.

With the above process, when the transmitting terminal 1 transmits a content to a plurality of receiving terminals 2, it is possible not only to reproduce the content in the receiving terminals 2 that have received the content, but also to make a setting for specifying whether or not to permit saving of the content and then transmit the content to the receiving terminals 2. While the above description has been made of an example where an identical saving flag is set for a plurality of receiving terminals 2, the saving flag may be set for each of the receiving terminals 2; for example, a saving flag for the receiving terminal 2-1 may be set to prohibit saving, and a saving flag for the receiving terminals 2-2 and 2-3 may be set to permit saving. As a result, such settings make it possible to set a saving flag to prohibit saving when a user A is allowed to view a content on the receiving terminal 2 but the content is not desired to be saved and viewed by other users, and to allow a user B to not only view the content on the receiving terminal 2 but also save the content as data and view the content on another receiving terminal.

In addition, since together with a saving flag, a reproduction time is set to a content, a time at which the transmitting terminal 1 reproduces the content and a time at which the receiving terminal 2 reproduces the content are the same. Thus, the same content can be synchronously and simultaneously viewed easily without the trouble of storing the content temporarily in a large server and downloading the content, for example.

According to the above description, in a situation where contents such as still images, moving images, sound or the like recorded in a predetermined device are transferred to one or a plurality of devices connected to a network and reproduced synchronously, a user of the device on a transmitting side can limit saving of each content by the device on a receiving side according to the receiver or the content without downloading the contents using the Internet or the like and large-scale equipment.

The series of processes described above can be carried out not only by hardware but also by software. When the series of processes is to be carried out by software, a program constituting the software is installed from a recording medium onto a computer incorporated in special hardware, or a general-purpose personal computer, for example, that can perform various functions by installing various programs thereon.

Figure 2:
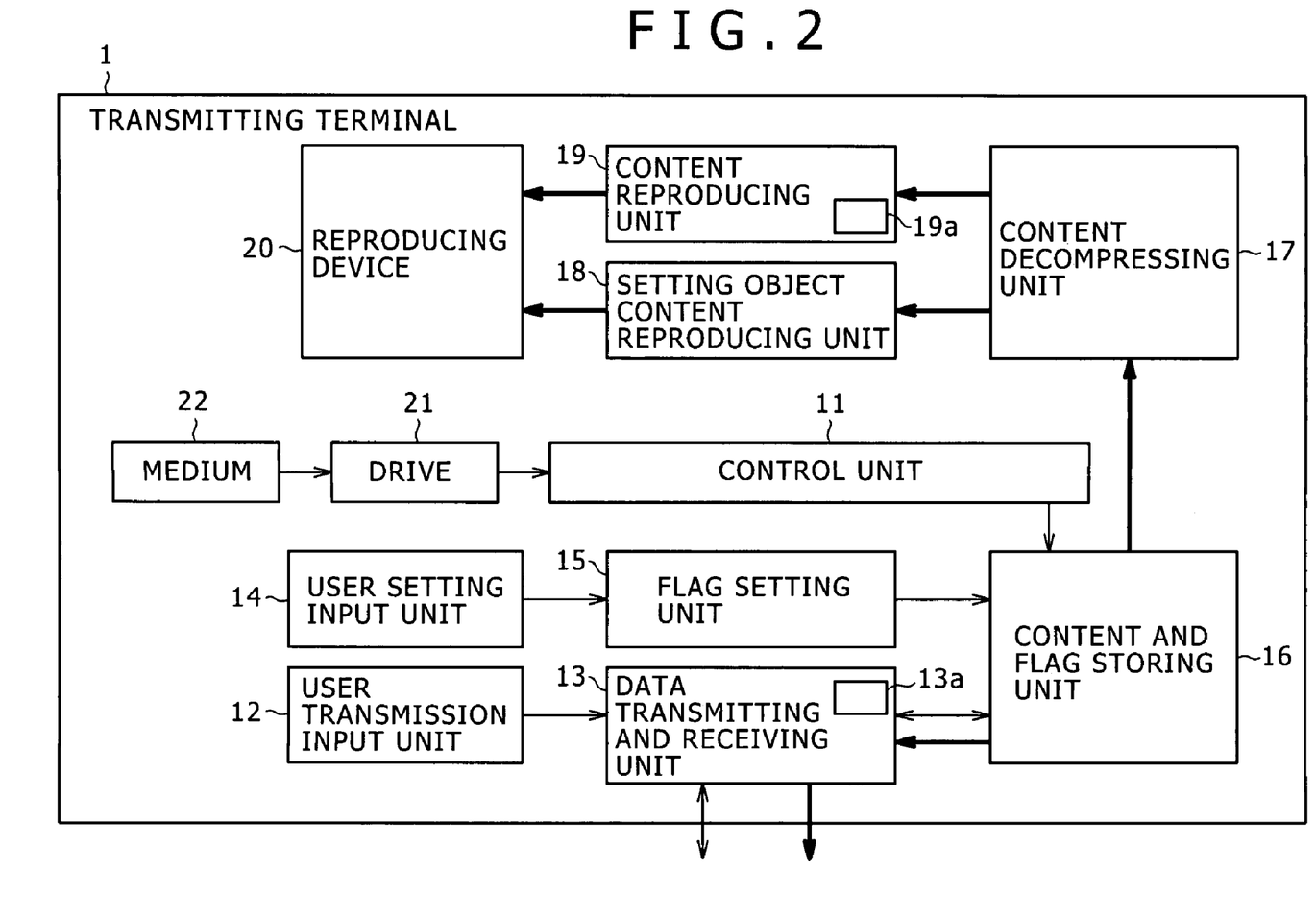
FIG. 2 is a diagram showing a configuration of a transmitting terminal in FIG. 1.
Figure 3:
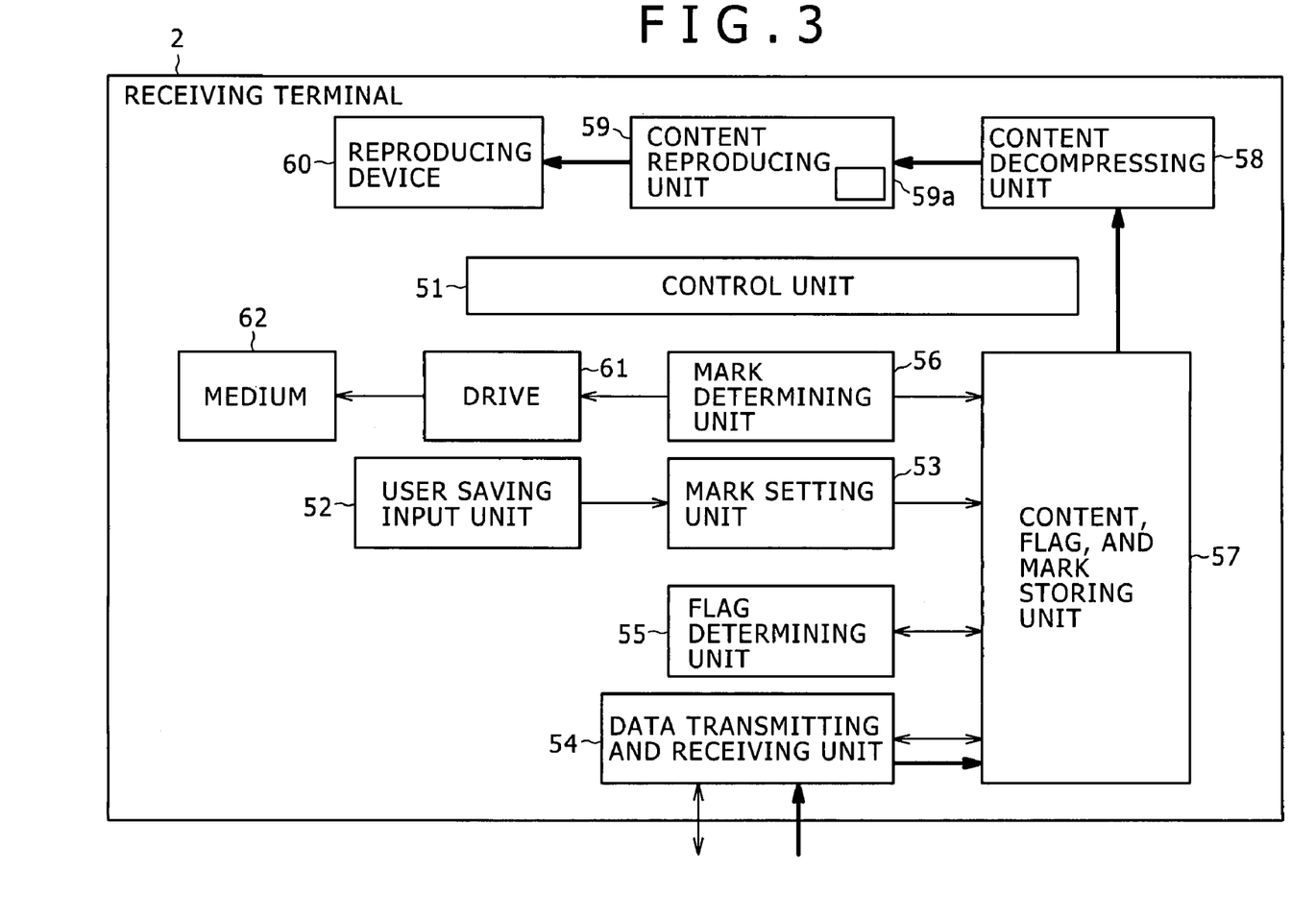
FIG. 3 is a diagram showing a configuration of a receiving terminal in FIG. 1.
Figure 9:
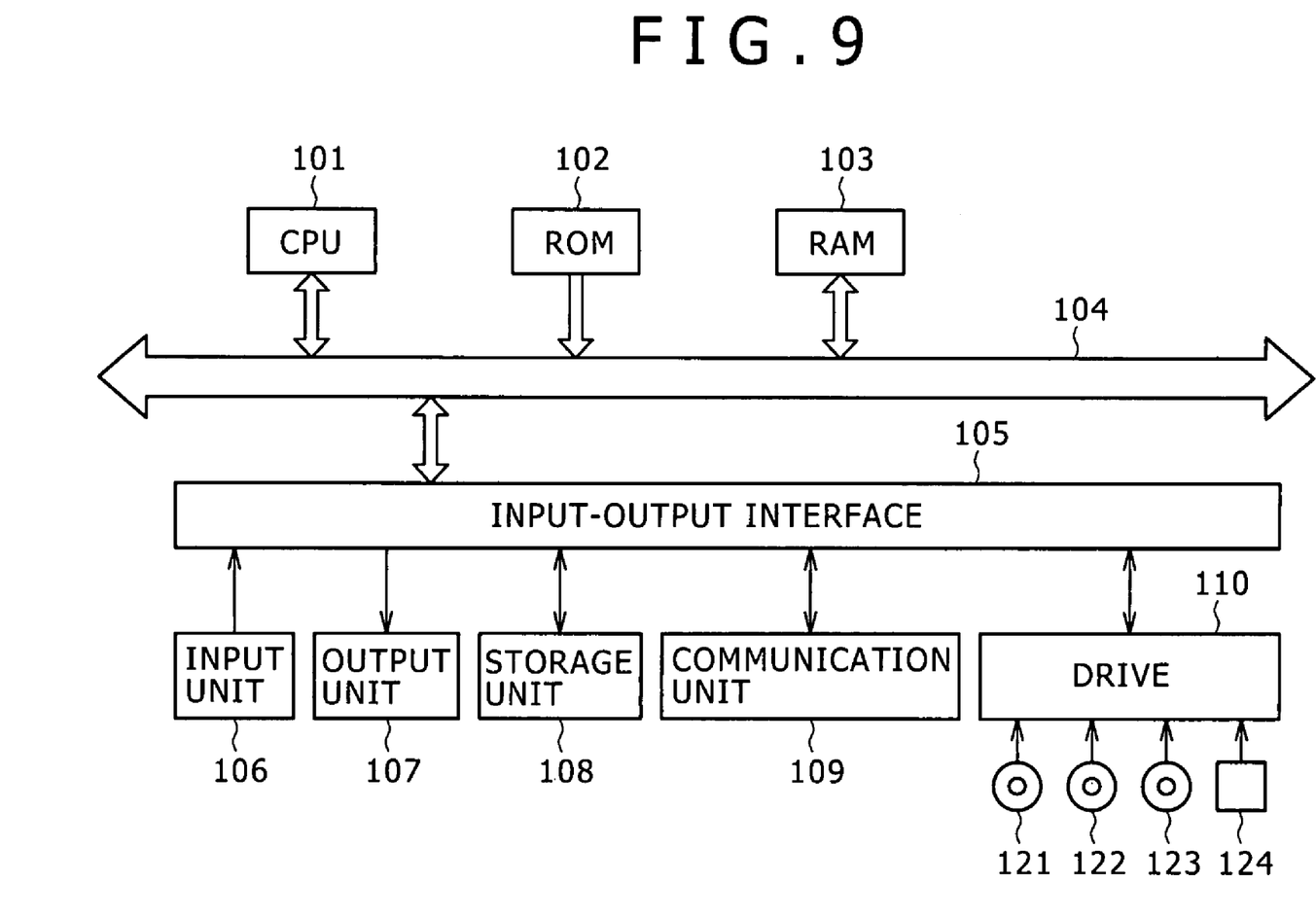
FIG. 9 is a diagram of assistance in explaining media.

FIG. 32 shows a configuration of an embodiment of a personal computer when the electric internal configuration of the transmitting terminal 1 of FIG. 2 and the receiving terminal 2 of FIG. 3 is realized by software. A CPU 101 in the personal computer controls operation of the whole of the personal computer. In addition, when a user inputs a command from an input unit 106 including a keyboard, a mouse and the like via a bus 104 and an input-output interface 105, the CPU 101 executes a program stored in a ROM (Read Only Memory) 102 in response to the command. Alternatively, the CPU 101 loads a program read from a magnetic disk 121, an optical disk 122, a magneto-optical disk 123, or a semiconductor memory 124 and installed in a storage unit 108 into a RAM (Random Access Memory) 103, and executes the program. Thereby, the functions of the client PC of FIG. 9 are implemented by software. Further, the CPU 101 controls a communication unit 109 to communicate with the outside, and thereby sends and receives data.

As shown in FIG. 9, the recording medium having the program recorded thereon is not only formed by a packaged medium distributed to users to provide the program separately from the computer and having the program recorded thereon, the packaged medium including the magnetic disk 121 (including flexible disks), the optical disk 122 (including CD-ROM (Compact Disk-Read Only Memory) and DVD (Digital Versatile Disk)), the magneto-optical disk 123 (including MD (Mini-Disc)), the semiconductor memory 124 or the like, but also formed by the ROM 102, a hard disk included in the recording unit 108, or the like where the program is recorded and which is provided to the user in a state of being preincorporated in the computer.

It is to be noted that in the present specification, the steps describing the program recorded on the recording medium include not only processes carried out in time series in the described order but also processes carried out in parallel or individually and not necessarily in time series.

In addition, in the present specification, a system refers to an apparatus as a whole formed by a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system including:
   a transmitting terminal; and
   a receiving terminal for receiving content from the transmitting terminal,
   wherein the transmitting terminal includes:
   first displaying means for displaying, synchronously with the receiving terminal, a portion of the content that has been transmitted to the receiving terminal;
   second displaying means for displaying a portion of the content that has yet to be transmitted to the receiving terminal;
   saving flag setting means for setting a saving flag, the saving flag specifying whether to permit or prohibit the receiving terminal to save the content after the receiving terminal receives and displays the content, the saving flag being set while the first displaying means is displaying the portion of the content that has been transmitted to the receiving terminal and while the second displaying means is displaying the portion of the content that has yet to be transmitted to the receiving terminal;
   adding means for adding the saving flag to the content; and
   transmitting means for transmitting the content to the receiving terminal with the saving flag, and
   wherein the receiving terminal includes:
   receiving means for receiving the content from the transmitting terminal;
   third displaying means for displaying the received content synchronously with the transmitting terminal;
   saving setting means for setting whether to save the received content, the setting being made while the third displaying means is displaying the received content;
   determining means for determining whether the saving flag permits or prohibits saving the received content; and
   saving means for saving the received content when the setting indicates to save the received content and the saving flag indicates that the saving of the received content is permitted.

2. A transmitting terminal for transmitting content to a receiving terminal, the transmitting terminal comprising:
   first displaying means for displaying, synchronously with the receiving terminal, a portion of the content that has been transmitted to the receiving terminal;
   second displaying means for displaying a portion of the content that has yet to be transmitted to the receiving terminal;
   saving flag setting means for setting a saving flag, the saving flag specifying whether to permit or prohibit the receiving terminal to save the content after the receiving terminal receives and displays the content, the saving flag being set while the first displaying means is displaying the portion of the content that has been transmitted to the receiving terminal and while the second displaying means is displaying the portion of the content that has yet to be transmitted to the receiving terminal;
   adding means for adding the saving flag to the content; and
   transmitting means for transmitting the content to the receiving terminal with the saving flag.

3. The transmitting terminal as claimed in claim 2, wherein the content includes sound data and image data.

4. The transmitting terminal as claimed in claim 2, further comprising:
   time information obtaining means for obtaining time information; and
   reproduction time information setting means for setting a reproduction time for the content;
   wherein the adding means adds information about the reproduction time to the content in addition to the saving flag, and
   the first displaying means displays the portion of the content that has been transmitted to said receiving terminal at the reproduction time, synchronously with the receiving terminal.

5. A method of transmitting content the method comprising:
   displaying, synchronously with a receiving terminal, a portion of the content that has been transmitted to the receiving terminal;
   displaying a portion of the content that has yet to be transmitted to the receiving terminal;
   setting a saving flag, the saving flag specifying whether to permit or prohibit the receiving terminal to save content after the receiving terminal receives and displays the content, the saving flag being set while displaying both the portion of the content that has been transmitted to the receiving terminal and the portion of the content that has yet to be transmitted to the receiving terminal;
   adding the saving flag to the content; and
   transmitting the content to the receiving terminal with the saving flag.

6. A medium containing processor readable instructions for causing a processor to execute a method of transmitting content, the method comprising:
   displaying, synchronously with a receiving terminal, a portion of the content that has been transmitted to the receiving terminal;
   displaying a portion of the content that has yet to be transmitted to the receiving terminal;
   setting step of setting a saving flag, the saving flag specifying whether to permit or prohibit the receiving terminal to save the content after the receiving terminal receives and displays the content, the saving flag being set while displaying both the portion of the content that has been transmitted to the receiving terminal and the portion of the content that has yet to be transmitted to the receiving terminal;

adding the saving flag to the content; and transmitting the content to the receiving terminal with the saving flag.

7. A receiving terminal for receiving content transmitted from a transmitting terminal, the receiving terminal comprising:

receiving means for receiving the content transmitted from the transmitting terminal, the received content including a saving flag specifying whether to permit or prohibit saving of the received content after the received content is displayed;

displaying means for displaying the received content synchronously with the transmitting terminal;

saving setting means for making a setting indicating whether to save the received content, the setting being made while the displaying means is displaying the received content;

determining means for determining whether the saving flag permits or prohibits saving the received content; and saving means for saving the received content when the setting indicates to save the received content and the saving flag specifies that saving the received content is permitted.

8. The receiving terminal as claimed in claim 7, wherein the received content includes sound data and image data.

9. The receiving terminal as claimed in claim 7, further comprising time information obtaining means for obtaining time information, wherein in addition to the saving flag, information about a reproduction time is included in the received content, and the displaying means displays the received content synchronously with the transmitting terminal.

10. The receiving terminal as claimed in claim 7, wherein saving means erases the received content if the setting indicates not to save the received content or the saving flap specifies that the saving of the received content is prohibited.

11. A method of receiving content transmitted from a transmitting terminal, the method comprising:

receiving the content transmitted from the transmitting terminal, the received content including a saving flag specifying whether to permit or prohibit saving of the received content after the received content is displayed;

displaying the received content synchronously with the transmitting terminal;

setting whether to save the received content, the setting being made while the received content is displayed;

determining whether the saving flag permits or prohibits saving the received content; and saving the received content when the setting indicates to save the received content and the saving flag specifies that the saving of the received content is permitted.

12. A medium containing processor readable instructions for causing a processor to execute a method of receiving content, the method comprising:

receiving the content transmitted from the transmitting terminal, the received content including a saving flag specifying whether to permit or prohibit saving of the received content after the received content is displayed;

displaying the received content synchronously with the transmitting terminal;

setting whether to save the received content, the setting being made while the received content is displayed;

determining whether the saving flag permits or prohibits saving the received content; and saving the received content when the setting indicates to save the received content and the saving flag specifies that the saving of the received content is permitted.

13. A transmitting terminal for transmitting content to a receiving terminal, the transmitting terminal comprising:

a first displaying section configured to display, synchronously with the receiving terminal, a portion of the content that has been transmitted to the receiving terminal;

a second displaying section configured to display a portion of the content that has yet to be transmitted to the receiving terminal;

a saving flag setting section configured to set a saving flag, the saving flag specifying whether to permit or prohibit the receiving terminal to save the content after the receiving terminal receives and displays the content, the saving flag being set while the first displaying section is displaying the portion of the content that has been transmitted to the receiving terminal and while the second displaying section is displaying the portion of the content that has yet to be transmitted to the receiving terminal;

an adder configured to add the saving flag to the content; and a transmitter configured to transmit the content to the receiving terminal with the saving flag.

14. A receiving terminal for receiving content transmitted from a transmitting terminal, the receiving terminal comprising:

a receiver configured to receive the content transmitted from the transmitting terminal, the received content including a saving flag specifying whether to permit or prohibit saving of the received content after the received content is displayed;

a displaying section configured to display the received content synchronously with the transmitting terminal;

a saving setting section configured to set whether to save the received content, the setting being made while the displaying section is displaying the received content;

a determining section configured to determine whether the saving flag permits or prohibits saving the received content; and a saving section configured to save the received content when the setting indicates to save the received content and the saving flag specifies that the saving of the received content is permitted.

* * * * *